United States Patent
Axelson et al.

(10) Patent No.: US 11,240,988 B2
(45) Date of Patent: Feb. 8, 2022

(54) CONTROL SYSTEM, METHOD AND COMPUTER PROGRAM FOR AN AUTOMATIC MILKING MACHINE

(71) Applicant: DELAVAL HOLDING AB, Tumba (SE)

(72) Inventors: Johan Axelson, Tumba (SE); Bengt Engman, Tumba (SE); Håkan Etell, Tumba (SE); Hans Hansson, Tumba (SE)

(73) Assignee: DeLaval Holding AB, Tumba (SE)

( * ) Notice: Subject to any disclaimer, the term of this patent is extended or adjusted under 35 U.S.C. 154(b) by 29 days.

(21) Appl. No.: 16/651,273

(22) PCT Filed: Sep. 24, 2018

(86) PCT No.: PCT/SE2018/050968
§ 371 (c)(1),
(2) Date: Mar. 26, 2020

(87) PCT Pub. No.: WO2019/066699
PCT Pub. Date: Apr. 4, 2019

(65) Prior Publication Data
US 2020/0260681 A1 Aug. 20, 2020

(30) Foreign Application Priority Data
Sep. 26, 2017 (SE) .................................... 1751189-0

(51) Int. Cl.
*A01J 5/007* (2006.01)
*G05B 19/042* (2006.01)

(52) U.S. Cl.
CPC ............ *A01J 5/007* (2013.01); *G05B 19/042* (2013.01); *G05B 2219/23322* (2013.01); *G05B 2219/2661* (2013.01)

(58) Field of Classification Search
CPC ........ A01J 1/00; A01J 3/00; A01J 5/00; A01J 5/007; A01J 7/00; A01K 1/12;
(Continued)

(56) References Cited

U.S. PATENT DOCUMENTS

| 6,584,931 B1 | 7/2003 | Käll | |
|---|---|---|---|
| 6,705,247 B1 * | 3/2004 | Heslin | A01J 5/007 |
| | | | 119/14.02 |

(Continued)

FOREIGN PATENT DOCUMENTS

| WO | 99/30277 A1 | 6/1999 |
|---|---|---|
| WO | 01/15518 A1 | 3/2001 |

(Continued)

OTHER PUBLICATIONS

SE Search Report, dated Apr. 24, 2018, from corresponding SE application No. 1751189-0.

(Continued)

*Primary Examiner* — Crystal J Barnes-Bullock
(74) *Attorney, Agent, or Firm* — Nixon & Vanderhye

(57) ABSTRACT

A control unit that controls an automatic milking machine to operate in accordance with control commands and/or parameter settings received from either of a local user interface fixedly arranged at the milking machine or a remote terminal, where the control unit, in response to receiving a lock command from one of the local user interface or the remote terminal, causes the automatic milking machine to operate in a single-control mode in which it operates exclusively to commands and/or parameter settings received from the one of the local user interface or the remote terminal that generated the lock command, in order to ensure predictable and safer operation of the milking machine particularly in view of personnel located in proximity of the milking machine.

12 Claims, 2 Drawing Sheets

(58) Field of Classification Search
CPC .................. A01K 29/00; G05B 19/042; G05B 2219/23322; G05B 2219/2661
See application file for complete search history.

(56) References Cited

U.S. PATENT DOCUMENTS

| | | | |
|---|---|---|---|
| 6,864,914 B1 | 3/2005 | Birk | |
| 7,051,673 B2* | 5/2006 | Brown | A01J 5/007 119/14.08 |
| 7,841,296 B2* | 11/2010 | Brown | A01J 5/007 119/14.08 |
| 7,992,519 B2 | 8/2011 | Odeberg et al. | |
| 8,794,182 B2* | 8/2014 | Eineren | A01J 5/0138 119/14.08 |
| 9,848,575 B2* | 12/2017 | Bareket | A01J 5/017 |
| 10,649,431 B2* | 5/2020 | Huettner | G05B 19/0423 |
| 2002/0045970 A1 | 4/2002 | Krause et al. | |
| 2006/0243211 A1 | 11/2006 | Eriksson et al. | |
| 2009/0260574 A1 | 10/2009 | Odeberg et al. | |
| 2013/0284098 A1 | 10/2013 | Eineren | |
| 2019/0079482 A1 | 3/2019 | Huettner et al. | |

FOREIGN PATENT DOCUMENTS

| | | |
|---|---|---|
| WO | 2005/000009 A1 | 1/2005 |
| WO | 2007/054435 A1 | 5/2007 |
| WO | 2008/051134 A1 | 5/2008 |
| WO | 2010/071413 A2 | 6/2010 |
| WO | 2015/001540 A1 | 1/2015 |
| WO | 2017/007675 A1 | 1/2017 |

OTHER PUBLICATIONS

International Search Report and Written Opinion, dated Nov. 29, 2018, from corresponding PCT application No. PCT/SE2018/050968.

* cited by examiner

CONTROL SYSTEM, METHOD AND COMPUTER PROGRAM FOR AN AUTOMATIC MILKING MACHINE

TECHNICAL FIELD

The present invention relates generally to control of milking machines. More particularly the invention relates to a control system according to the preamble of claim 1 and a corresponding method. The invention also relates to a computer program and a non-volatile data carrier.

BACKGROUND

Today, there are automatic milk extraction systems with remote-control interfaces. These interfaces are advantageous because they enhance the overall efficiency and provide the farmer with a flexible means of interaction with different pieces of milking equipment.

WO 2005/000009 describes one example of a method and a system for remote supervision of an automatic milking system by use of a computer means. Web-documents are here obtained from the computer means which web-documents contain information about a milking station and/or animals. A connection is established between the automatic milking system and a communication unit. Web documents are then created and transmitted to the communication unit.

Although such remote-control operation of an automatic milking machine and its auxiliary components may be highly beneficial, in some cases safety issues may arise. For example, there is a potential risk of personal injury if an operator is located near a milking robot while the milking robot is being remotely controlled.

In addition, the fact that there are dual control interfaces to the milking machine may render it difficult to ascertain that the control commands and/or parameter settings entered via a particular interface are actually effected at the milking machine.

SUMMARY

The object of the present invention is therefore to mitigate the above problems and offer a safer and more reliable system for controlling an automatic milking machine.

According to one aspect of the invention, the object is achieved by the initially described system, wherein the local user interface is configured to produce a lock command to the control unit in response to a first operator-generated instruction. The control unit, in turn, is configured to set the automatic milking machine in a single-control mode in response to the lock command. In the single-control mode, the automatic milking machine is locked to operate exclusively in response to control commands and/or parameter settings from a single control source identified in connection with producing the lock command. Here, the single control source is either the local user interface or a particular remote terminal.

The proposed control system is advantageous because it ensures that the control of the milking machine cannot be lost to another user accessing the milking machine via an alternative interface. Naturally, this conduces to both improved predictability and safety.

It is beneficial if the control unit is configured to maintain the single-control mode until an unlock command is received via the local user interface, for example in response to a second operator-generated instruction there. Consequently, once the automatic milking machine has been set in single-control mode operation, this means of control can only be interrupted by an operator who is physically present at the milking machine.

According to one embodiment of this aspect of the invention, the local user interface contains at least one visual indicator and/or one acoustic indicator, and the control unit is configured to cause said visual/acoustic indicator to reflect an operation mode in which the automatic milking machine is set to operate. Hence, via the local user interface, an operator located in proximity of the milking machine may conveniently determine the current operation mode of the machine. This, in turn, is an important factor when deciding whether or not it is safe to enter into the machine's work area.

According to another embodiment of this aspect of the invention, the control unit is configured to receive a connection request from a remote user terminal via the communication interface. The connection request indicates an intention to initiate transmission of control commands and/or parameter settings from the user terminal for controlling the automatic milking machine. In response to the connection request, the control unit is configured to send status data to the user terminal. The status data reflect whether or not the automatic milking machine is set to operate in the single-control mode. Thus, an operator becomes informed of if it is possible for him/her gain control over the milking machine in a straightforward manner.

According to yet another embodiment of this aspect of the invention, the control unit is further configured to enable the remote terminal to transmit the control commands and/or parameter settings to the communication interface if the automatic milking machine is set to operate in the single-control mode in response to control commands and/or parameter settings from that particular terminal; or if the automatic milking machine is set not to operate in the single-control mode. Hence, an authorized user can readily be given access to the automatic milking machine, while any other user is prevented from controlling it.

According to another aspect of the invention, the object is achieved by a method of controlling an automatic milking machine. The method is implemented in a control unit associated with the milking machine, and the method includes:

causing the milking machine to operate in accordance with control commands and/or parameter settings; and receiving the control commands and/or parameter settings from a local user interface fixedly arranged at the milking machine, or from a wireless user terminal in communicative connection with the control unit through a network and a communication interface. More precisely, the method involves producing a lock command to the control unit in response to a first operator-generated instruction at the local user interface.

Further, in response to the lock command, the method involves setting the automatic milking machine in a single-control mode in which the machine is locked to operate exclusively in response to control commands and/or parameter settings from a single control source identified in connection with producing the lock command. Here, the single control source is either the local user interface or a particular remote terminal.

The advantages of this method, as well as the preferred embodiments thereof, are apparent from the discussion above with reference to the proposed control system.

According to a further aspect of the invention the object is achieved by a computer program loadable into a non-volatile data carrier communicatively connected to a processing unit. The computer program includes software for executing the above method when the program is run on the processing unit.

According to another aspect of the invention the object is achieved by a non-volatile data carrier containing the above computer program.

Further advantages, beneficial features and applications of the present invention will be apparent from the following description and the dependent claims.

BRIEF DESCRIPTION OF THE DRAWINGS

The invention is now to be explained more closely by means of preferred embodiments, which are disclosed as examples, and with reference to the attached drawings.

DETAILED DESCRIPTION

Figure 1:
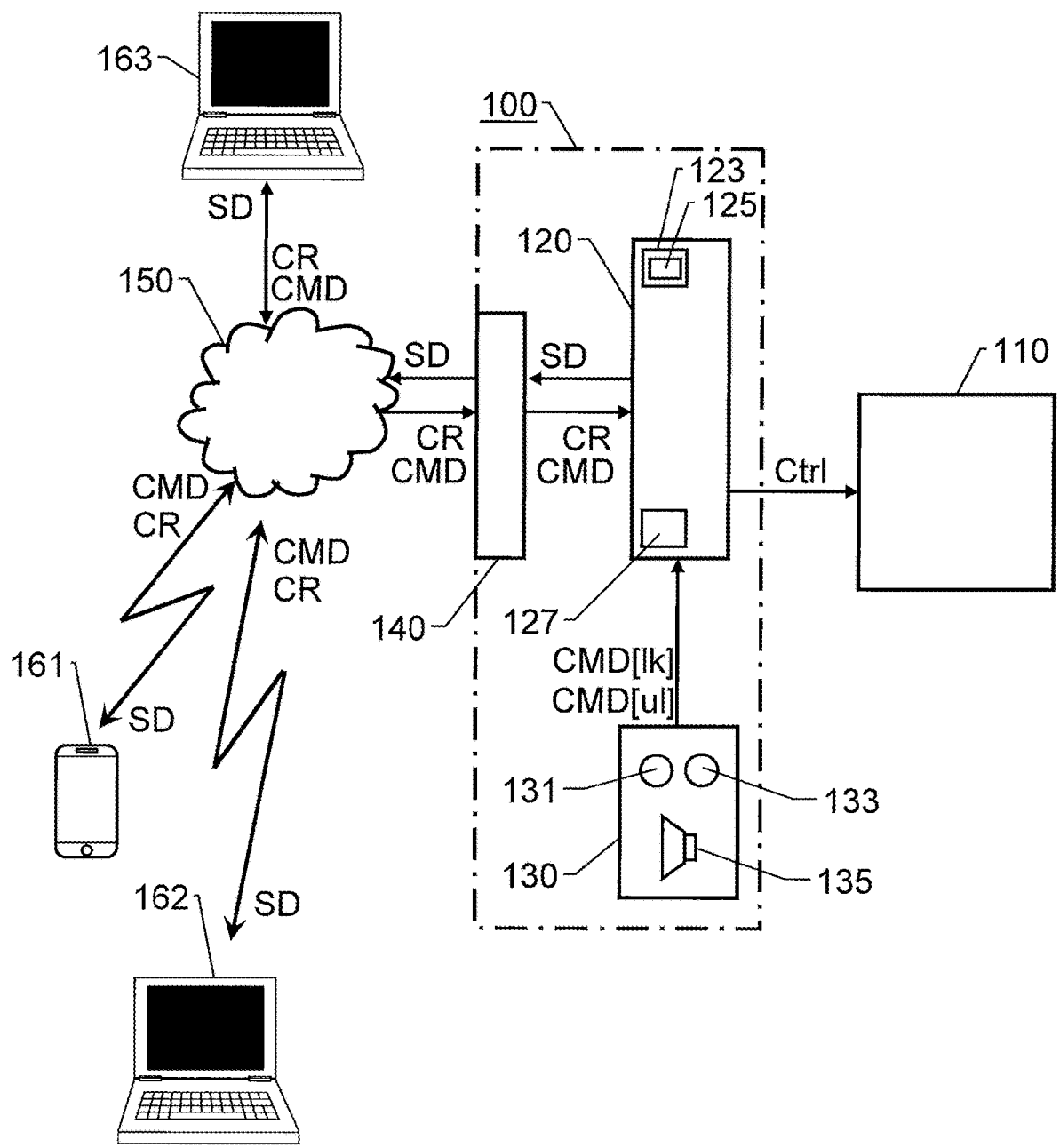
FIG. 1 shows a system according to one embodiment of the invention.

FIG. 1 shows an example of a system 100 according to one embodiment of the invention. Here, a control unit 120 is configured to control an automatic milking machine 110 to operate in a certain manner via a control signal Ctrl. The control signal Ctrl, in turn, is generated in accordance with control commands and/or parameter settings CMD that are received in the control unit 120 either via a local user interface 130 or through a communication interface 140.

The local user interface 130 is fixedly arranged at the automatic milking machine 110 and is configured to receive operator-generated instructions and in response thereto produce the control commands and/or parameter settings CMD to the control unit 120. The communication interface 140 is configured to receive the control commands and/or parameter settings CMD from a remote terminal, which for example may be represented by a wireless user terminal 161, e.g. in the form of a smartphone, a phablet or a tablet computer; a portable computer 162, e.g. in the form of a laptop or any other kind of computer 163. The remote terminals 161, 162 and/or 163 are communicatively connected to the communication interface 140 via at least one network 150. Depending on the type of connection used, the at least one network 150 may also include one or more wireless access networks. In other words, if the remote terminal has a wireless interface to the communication interface 140, the at least one network 150 includes a wireless access network adapted to said wireless interface.

The local user interface 130 is configured to produce a lock command CMD[lk] to the control unit 120 in response to a first operator-generated instruction.

In response to the lock command CMD[lk], in turn, the control unit 120 is configured to set the automatic milking machine 110 in a single-control mode. In connection with producing the lock command CMD[lk] via the local user interface 130, a single control source is identified. For example, this can be done by generating a particular command in the control source in question simultaneously with (or within a specific period from) entering the first operator-generated instruction in the local user interface 130. In any case, the overall user interaction is designed such that entering a valid first operator-generated instruction requires that an operator is physically present at the automatic milking machine 110 when entering the lock command CMD[lk].

To enable the remote control of the automatic milking machine 110 from the remote terminals 161, 162 and 163, a dedicated software, e.g. in the form of a software/app, may be installed in the remote terminals 161, 162 and 163 respectively.

Of course, according to the invention, the local user interface 130 may be implemented in many different ways. A touchscreen GUI (graphical user interface) is one example, and a button box is another example. A display with associated keys or buttons is yet another example of how the local user interface 130 can be implemented.

In the single-control mode, the automatic milking machine 110 is locked to operate exclusively in response to control commands and/or parameter settings CMD from the single control source that was identified in connection with producing the lock command CMD[lk]. In the embodiment shown in FIG. 1, the single control source can be represented by any one of the local user interface 130, or the remote terminals, i.e. the wireless user terminal 161, the portable computer 162 or the computer 163.

After having entered the single-control mode, the control unit 120 is preferably configured to maintain the automatic milking machine 110 in the single-control mode until an unlock command CMD[ul] is received via the local user interface 130.

According to one embodiment of the invention, the local user interface 130 is configured to produce the unlock command CMD [ul] in response to a second operator-generated instruction. I.e. analogous to the lock command CMD[lk], the overall user interaction is designed such that entering a valid second operator-generated instruction so as to unlock the automatic milking machine 110 from a given control source, it is required that an operator is physically present at the automatic milking machine 110 to enter the second operator-generated instruction at the local user interface 130.

Such locking and unlocking procedures represent important safety features with respect to any personnel located in the vicinity of the milking machine. Namely, assuming that the automatic milking machine includes robot arm for controlling the milk cluster, this piece of equipment constitutes a potential injury risk for a human operator. Therefore, it is appealing for a local operator to know that the control of the automatic milking machine cannot be overtaken remotely once the machine has been locked to operate exclusively in response to control commands and/or parameter settings CMD from a particular control source.

It is also worth mentioning that other parts possibly included the automatic milking machine may constitute potential sources of injury to a human operator, e.g. automatic entry and exit gates. Therefore, preferably, taking control over these parts likewise requires physical presence at the automatic milking machine 110 by entering the second operator-generated instruction at the local user interface 130.

According to one embodiment of the invention, the local user interface 130 includes at least one visual indicator 131 and/or 133 respectively. The control unit 120 is further configured to cause the at least one visual indicator 131 and/or 133 to reflect whether or not the automatic milking machine 110 is set to operate in the single-control mode. This may involve causing the at least one visual indicator 131 and/or 133 to flash in a particular pattern if the automatic milking machine 110 set to operate in the single-control mode (e.g. be lit up during a relatively short interval, and then be dark during a relatively long interval, and so on), and otherwise be dark always. Moreover, the control unit 120 may be configured to cause the at least one visual indicator 131 and/or 133 to flash in different patterns depending on if the automatic milking machine 110 is locked to the operate in response to control commands and/or parameter settings CMD from the local control source (i.e. via the local interface 130), or in response to control commands and/or parameter settings CMD from a remote control source (i.e. via any one of the terminals 161, 162 or 163 respectively).

Naturally, in addition to, or as an alternative thereto, one or more further visual indicators may be included in the local user interface 130 to reflect additional and/or alternative operation modes.

In further addition thereto and/or as yet an alternative, the local user interface 130 may include an acoustic indicator 137 (e.g. a beeper, buzzer or a loudspeaker) to reflect additional operation modes for the milking machine 110 and/or to indicate the control source in an alternative way.

Naturally, at least one input member of the local user interface 130 may contain at least one of the at least one visual indicator 131 and/or 133, for example in the form of a light source integrated into a button or key on a control panel.

According to one embodiment of the invention, the control unit 120 is configured to receive a control request CR from a remote user terminal 161, 162 or 163 via the communication interface 140. The control request CR indicates an intention to initiate transmission of control commands and/or parameter settings CMD from the particular user terminal in question. In response to the control request CR, the control unit 120 is configured to send status data SD to the user terminal that originated the control request CR via the communication interface 140. The status data SD reflect whether or not the automatic milking machine 110 is set to operate in the single-control mode. Thus, through the status data SD, an operator becomes readily informed of whether or not it presently is possible for him/her gain control over the automatic milking machine 110.

Namely, as mentioned above, the control unit 120 is configured to enable a control source in the form of a remote terminal (i.e. 161, 162 or 163 respectively) to transmit the control commands and/or parameter settings CMD to the communication interface 140 only if the automatic milking machine 110 is not already locked to another control source. Specifically, this means that a given remote terminal may only transmit control commands and/or parameter settings CMD to the communication interface 140 if:
(a) the automatic milking machine 110 is set to operate in the single-control mode in response to control commands and/or parameter settings CMD from the remote control source in question; or
(b) the automatic milking machine 110 is not yet set to operate in the single-control mode.

It is generally advantageous if the control unit 120 is configured to effect the above-described procedure in an automatic manner, for instance by executing a computer program 125. Therefore, the control unit 120 may be communicatively connected to a memory unit, i.e. non-volatile data carrier 123, storing the computer program 125, which, in turn, contains software for making at least one processor 127 in the control unit 120 execute the above-described actions when the computer program 125 is run in the control unit 120.

Figure 2:
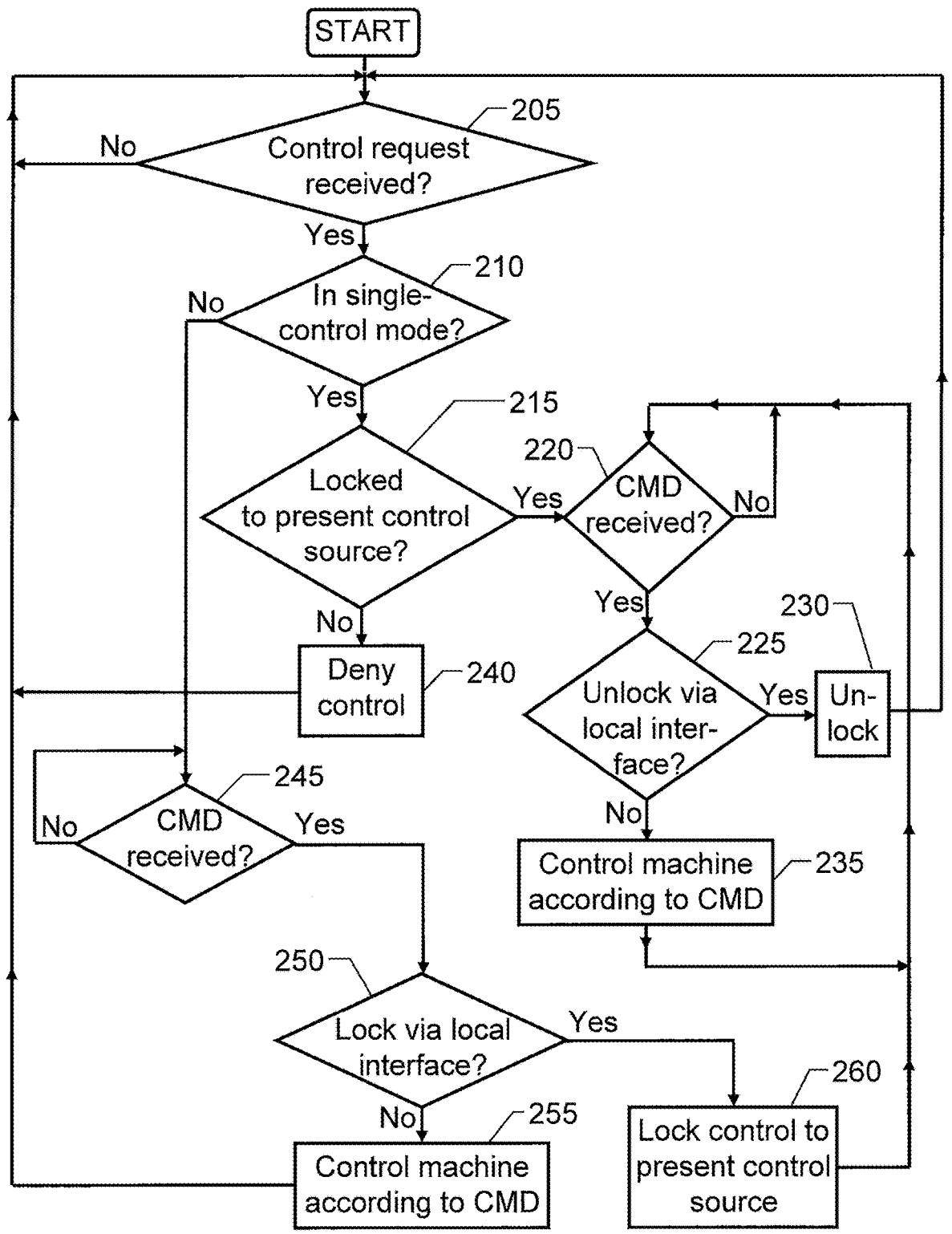
FIG. 2 illustrates, by means of a flow diagram, a method according to one embodiment of the invention of controlling an automatic milking machine.

In order to sum up, and with reference to the flow diagram in FIG. 2, we will now describe the general method according to the invention of controlling the automatic milking machine 110 via the control unit 120.

In a first step 205, it is checked if a control request has been received. If so, a step 210 follows; and otherwise, the procedure loops back and stays in step 205.

In step 210 it is checked if the automatic milking machine is presently set in the single-control mode (i.e. where it is locked to only receive control commands and/or parameters settings from a particular control source). If it is found that the single-control mode is activated, a step 215 follows; and otherwise, the procedure continues to a step 245. In step 215 it is checked if the automatic milking machine is locked to the present control source, i.e. the control source from which the control request was received in step 205. If, in step 215, it is found that the automatic milking machine is locked to the present control source, a step 220 follows. Otherwise, the procedure continues to a step 240, where the requested control is denied. Thereafter, the procedure loops back to step 205.

In step 220 it is checked if at least one control command or parameter setting has been received; and if so, a step 225 follows. Otherwise, the procedure loops back and stays in step 220. In step 225 it is checked if the at least one control command or parameter setting involves unlocking the automatic milking machine from the single-control mode; and if so, a step 230 follows in which unlocking occurs. Thereafter, the procedure loops back to step 205. If, in step 225, it is found that the received at least one control command or parameter setting does not involve unlocking, the at least one control command or parameter setting relates to the automatic milking machine as such, and a step 235 follows in which the automatic milking machine is controlled accordingly. Subsequently, the procedure loops back to step 220.

In step 245 it is checked if at least one control command or parameter setting has been received, and if so a step 250 follows. Otherwise, the procedure loops back and stays in step 245. In step 250 it is checked if the at least one control command or parameter setting involves locking the automatic milking machine to the single-control mode—and via a command entered in the local user interface—to the present control source. If, in step 250, it is found that the received at least one control command or parameter setting does not involve locking, the at least one control command or parameter setting relates to the automatic milking machine as such, and a step 255 follows in which the automatic milking machine is controlled accordingly. If, however, in step 250, it is found that the at least one control command or parameter setting is a locking command, the procedure continues to step 260. In step 260, the automatic milking machine is locked to the control source identified in step 250. Thereafter, the procedure continues to step 220.

All of the process steps, as well as any sub-sequence of steps, described with reference to FIG. 2 may be controlled by means of a programmed processor. Moreover, although the embodiments of the invention described above with reference to the drawings comprise processor and processes performed in at least one processor, the invention thus also extends to computer programs, particularly computer programs on or in a carrier, adapted for putting the invention into practice. The program may be in the form of source code, object code, a code intermediate source and object code such as in partially compiled form, or in any other form suitable for use in the implementation of the process according to the invention. The program may either be a part of an operating system, or be a separate application. The carrier may be any entity or device capable of carrying the program. For example, the carrier may comprise a storage medium, such as a Flash memory, a ROM (Read Only Memory), for example a DVD (Digital Video/Versatile Disk), a CD (Compact Disc) or a semiconductor ROM, an EPROM (Erasable Programmable Read-Only Memory), an EEPROM (Electrically Erasable Programmable Read-Only Memory), or a magnetic recording medium, for example a floppy disc or hard disc. Further, the carrier may be a transmissible carrier such as an electrical or optical signal which may be conveyed via electrical or optical cable or by radio or by other means. When the program is embodied in a signal which may be conveyed directly by a cable or other device or means, the carrier may be constituted by such cable or device or means. Alternatively, the carrier may be an integrated circuit in which the program is embedded, the integrated circuit being adapted for performing, or for use in the performance of, the relevant processes.

The term "comprises/comprising" when used in this specification is taken to specify the presence of stated features, integers, steps or components. However, the term does not preclude the presence or addition of one or more additional features, integers, steps or components or groups thereof.

The invention is not restricted to the described embodiments in the figures, but may be varied freely within the scope of the claims.

The invention claimed is:

1. A system (100) for controlling an automatic milking machine (110), the system (100) comprising:
   a local user interface (130) configured to receive operator-generated instructions for controlling the milking machine, the local user interface (130) being fixedly arranged at the automatic milking machine (110);
   a communication interface (140) configured to communicate, via at least one network (150), with a remote terminal (161, 162, 163); and
   a control unit (120), in communication with both the local user interface (130) and the communication interface (140) and configured to cause the automatic milking machine (110) to operate in accordance with control commands and/or parameter settings (CMD) received from either of the local user interface (130) or the remote terminal via the communication interface (140),
   wherein the control unit (120) is configured, in response to receipt of a lock command (CMD[lk]), generated by the local user interface (130), that sets the automatic milking machine (110) to operate in a single-control mode in which the automatic milking machine (110) is locked to operate exclusively to control commands and/or parameter settings (CMD) received from a single control source, said single control source being one of the local user interface (130) and the remote terminal (161, 162, 163) identified in connection with producing the lock command (CMD[lk]) by the local user interface (130), and
   wherein the control unit (120) is configured to maintain the automatic milking machine (110) in the single-control mode until an unlock command (CMD[ul]) is received from the local user interface (130).

2. The system (100) according to claim 1, wherein the local user interface (130) is configured to generate the unlock command (CMD[ul]) in response to a second operator-generated instruction.

3. The system (100) according to claim 1, wherein the local user interface (130) comprises at least one of a visual indicator (131; 133) and an acoustic indicator (135), and the control unit (120) is configured to cause the at least one of a visual indicator (131; 133) and an acoustic indicator (135) to provide a human-perceivable indication whether or not the automatic milking machine (110) is set to operate in the single-control mode.

4. The system (100) according to claim 3, wherein at least one input member (131; 133) of the local user interface (130) comprises at least one of the at least one visual indicator (131; 133).

5. The system (100) according to claim 1, wherein the control unit (120) is configured to:
   receive, via the communication interface (140), a control request (CR) from the remote user terminal (161, 162, 163), the control request (CR) indicating an intention to initiate transmission of control commands and/or parameter settings (CMD) from the user terminal (161, 162, 163) for controlling the automatic milking machine (110), and
   in response to the control request (CR), send, via the communication interface (140), status data (SD) to the user terminal (161, 162, 163), the status data (SD) that indicates whether or not the automatic milking machine (110) is set to operate in the single-control mode.

6. The system (100) according to claim 5, wherein the control unit (120) is further configured to cause the automatic milking machine (110) to operate in accordance with control commands and/or parameter settings (CMD) received from the remote terminal via the communication interface (140) if and only if the automatic milking machine (110):
   is set to operate in the single-control mode so as operate to control commands and/or parameter settings (CMD) from said remote terminal (161, 162, 163), or
   is not set to operate in the single-control mode.

7. A method of controlling (Ctrl) an automatic milking machine (110) implemented by a control unit (120) associated with the milking machine (110) and that controls and operates the milking machine (110), the method comprising:
   receiving control commands and/or parameter settings (CMD) at the control unit (120) for controlling and operating the milking machine (110), said control commands and/or parameter settings (CMD) received either from a local user interface (130) that is fixedly arranged at the automatic milking machine (110) or from a remote terminal (161, 162, 163) in communicative connection with the control unit (120) via at least one network (150) and a communication interface (140) of a controller that is in communication with the network;
   receiving a lock command (CMD[lk]) at the control unit (120), the lock command (CMD[lk]) having been generated and transmitted by the local user interface (130);
   in response to said receiving of the lock command (CMD [lk]), setting the automatic milking machine (110) to operate in a single-control mode in which the automatic milking machine (110) is locked to operate exclusively to control commands and/or parameter settings (CMD) received from a single control source, said single control source being one of the local user interface (130) and the remote terminal (161, 162, 163) identified in connection with producing the lock command (CMD [lk]) by the local user interface (130); and
   maintaining the automatic milking machine (110) in the single-control mode until an unlock command (CMD [ul]) is received from the local user interface (130).

8. The method according to claim 7, further comprising:
receiving the unlock command (CMD[ul]) via the local user interface (130) in response to a second operator-generated instruction at the local user interface (130).

9. The method according to claim 7,
wherein the local user interface (130) comprises at least one of a visual indicator (131; 133) and an acoustic indicator (135),
and the method further comprises:
causing the at least one of a visual indicator (131; 133) and an acoustic indicator (135) to provide a human-perceivable indication whether or not the automatic milking machine (110) is set to operate in the single-control mode.

10. The method according to claim 7, further comprising:
receiving, via the communication interface (140), a control request (CR) from the remote user terminal (161, 162, 163), the control request (CR) indicating an intention to initiate transmission of control commands and/or parameter settings (CMD) from the user terminal (161, 162, 163) for controlling the milking machine (110); and
in response to the control request (CR), sending, via the communication interface (140), status data (SD) to the user terminal (161, 162, 163), the status data (SD) indicating an operation mode in which the automatic milking machine (110) is set to operate.

11. The method according to claim 10, further comprising:
operating the milking machine in accordance with control commands and/or parameter settings (CMD) received from the remote terminal via the communication interface (140) if and only if:
the automatic milking machine (110) is set to operate in the single-control mode so as operate to control commands and/or parameter settings (CMD) from said remote terminal (161, 162, 163), or
the automatic milking machine (110) is not set to operate in the single-control mode.

12. A non-transitory computer-readable data medium having stored thereon a computer program (125) executable by a processing unit (127), the computer program (125) comprising software that, upon execution by the processing unit (127), causes the processing unit (127) of a control unit (120), associated with a milking machine (110) and that controls and operates the milking machine (110), to carry out a method of controlling the automatic milking machine comprising the following steps:
receiving control commands and/or parameter settings (CMD) at the control unit (120) for controlling and operating the milking machine (110), said control commands and/or parameter settings (CMD) received either from a local user interface (130) that is fixedly arranged at the automatic milking machine (110) or from a remote terminal (161, 162, 163) in communicative connection with the control unit (120) via at least one network (150) and a communication interface (140) of a controller that is in communication with the network;
receiving a lock command (CMD[lk]) at the control unit (120), the lock command (CMD[lk]) having been generated and transmitted by the local user interface (130);
in response to said receiving of the lock command (CMD[lk]), setting the automatic milking machine (110) to operate in a single-control mode in which the automatic milking machine (110) is locked to operate exclusively to control commands and/or parameter settings (CMD) received from a single control source, said single control source being one of the local user interface (130) and the remote terminal (161, 162, 163) identified in connection with producing the lock command (CMD [lk]) by the local user interface (130); and
maintaining the automatic milking machine (110) in the single-control mode until an unlock command (CMD [ul]) is received from the local user interface (130).

* * * * *